United States Patent [19]

Mitsuda

[11] Patent Number: 5,214,446
[45] Date of Patent: May 25, 1993

[54] GRADATION RECORD PRINTER
[75] Inventor: Hiroshi Mitsuda, Hiroshima, Japan
[73] Assignee: Mitsubishi Denki K.K., Tokyo, Japan
[21] Appl. No.: 646,313
[22] Filed: Jan. 28, 1991
[30] Foreign Application Priority Data
  Feb. 27, 1990 [JP] Japan ................................ 2-47981
[51] Int. Cl.⁵ ......................................... B41J 02/325
[52] U.S. Cl. .............................. 346/76 PH; 358/298
[58] Field of Search ................... 346/76 PH; 358/298
[56] References Cited

U.S. PATENT DOCUMENTS 4,699,531 10/1987 Ulinski, Sr. et al. ............ 346/76 PH
4,843,409 6/1989 Matsuzaki ........................ 346/76 PH
4,939,581 7/1990 Shalit ................................ 358/244

FOREIGN PATENT DOCUMENTS 0068702 5/1983 European Pat. Off. .
0132794 2/1985 European Pat. Off. .
3714921 11/1987 Fed. Rep. of Germany .
3735964 4/1988 Fed. Rep. of Germany .
63-19273 1/1988 Japan .
0297265 11/1989 Japan .

Primary Examiner—Benjamin R. Fuller
Assistant Examiner—Huan Tran
Attorney, Agent, or Firm—Sughrue, Mion, Zinn, Macpeak & Seas

[57] ABSTRACT

A gradation record printer in which an amount of energy applied to a thermal head is controlled in response to a gradation level of an input image signal to print an image on a printing medium with gradations. The printer comprises a gradation density detecting unit for storing data of standard density patterns with respect to address values corresponding to gradation levels and for outputting a coincidence signal when data supplied from an outside of the gradation density detecting unit substantially coincides with the data of standard density patterns. A gradation test print circuit is used to apply data of different amounts of printing energy to the thermal head sequentially to make a gradation test print on the printing medium. A density detecting sensor detects densities of the gradation test print and applies a detection output from the density detecting sensor to the gradation density detecting unit. A memory element stores the data of different amounts of energy with respect to address values corresponding to the gradation levels in response to the coincidence signal from the gradation density detecting unit.

9 Claims, 4 Drawing Sheets

GRADATION RECORD PRINTER

BACKGROUND OF THE INVENTION

1. Field of the Invention

This invention relates to a gradation record printer in which, as in a heat-sensitive printer using heat-sensitive sheets, or in a sublimation type printer using a sublimation type ink sheet and an ink receiving sheet, the amount of energy applied to a thermal head is controlled to print an image on a printing medium with gradations, and more particularly to an improvement of the printer that gradations can be reproduced satisfactorily with printing media such as heat-sensitive sheets and ink sheets different in thermal characteristic.

2. Description of the Related Art

FIG. 6 is a block diagram showing the arrangement of a conventional gradation record printer disclosed, for instance, by Unexamined Japanese Patent Publication No. Sho. 63-19273. FIG. 7 is a graphical representation indicating gradation numbers with amounts of energy applied to the thermal head (sixty-four (64) gradations). Here, the gradation number is defined as a number indicating a gradation of an image signal. In FIG. 7, the gradation numbers of zero through sixty-three are used to express the sixty-four gradations. In general, printing media are heat-sensitive sheets, or ink sheets and printing sheets. Those sheets have their own thermal characteristics, depending on their kinds and manufacturers.

In FIG. 6, reference numeral 1 designates a platen; 2, a thermal head; 3, a printing sheet; 4, a ROM (read-only memory) for storing feed (current application) time width data for setting the amounts of energy which are to be applied to the thermal head 2 with respect to gradation numbers; 5, a gradation counter for producing gradation numbers successively beginning with the gradation zero; 6, a feed pulse generating circuit for forming feed pulses in correspondence to feed time width data; 7, a printing control circuit comprising a shift register 7a, and a group of latch circuits 7b; and 8, a comparator which compares the gradation number of an input image signal with the gradation number provided by the gradation counter 5, and applies the feed time width data of the ROM 4 to the feed pulse generating circuit 6 with the coincident gradation number as the address number (read address) of the ROM 4. In the gradation record printer thus organized, the feed time widths corresponding to the gradation numbers are stored as data in the addresses in the ROM 4 whose address numbers correspond to the gradation numbers in the relation between the feed time width and the gradation number as indicated by the curve C in FIG. 7.

The operation of the gradation record printer thus constructed will be described. In the comparator 8, the gradation number of a picture element of an input image signal is compared with a gradation number provided by the gradation counter 5, so that, with the gradation number equal to the gradation number of the image signal as a read address, the feed time width data of the address is read out of the ROM 4 and is applied to the feed pulse generating circuit 6. The circuit 6 generates a feed pulse in correspondence to the feed time width data. The feed pulse is generated for every picture element and applied to the printing control circuit 7, where the feed pulses are combined with the synchronizing signal provided through the comparator 8 into a printing signal for one line. The printing signal thus formed is applied to the thermal head 2, to start a printing operation.

In the conventional gradation record printer thus organized, the relationship between the gradation number and the feed time width (or the amount of energy to be applied) is, in general, established in accordance with the thermal characteristics of a printing sheet which is most frequently used. In this case, the relationship between them established is as indicated by the curve C in FIG. 7.

In this connection, let us consider the case where a different printing sheet is used whose thermal characteristic is as indicated by the curve D in FIG. 7. If, in this case, the gradation number is $n_2$, the feed time width is smaller by $\Delta E_2$ in the case of using a printer set in accordance with the curve C. That is, the amount of energy is insufficient, and the resultant density is not acceptable. If the gradation number is $n_1$, the feed time width is larger by $\Delta E_1$. That is, the resultant density is larger than the predetermined value. Hence, in the printing operation, the gradations reproduced are unsatisfactory.

SUMMARY OF THE INVENTION

Accordingly, an object of this invention is to eliminate the above-described difficulty accompanying a conventional gradation record printer. More specifically, a first object of the invention is to provide a gradation record printer which can reproduce gradations as required even if a printing sheet is used whose thermal characteristic is different from that of the printing sheet which is usually used.

A second object of the invention is to provide a gradation record printer in which the gradation test printing is less affected by the contamination etc. of the printing medium, whereby the gradations are reproduced satisfactorily.

A gradation record printer according to the invention in which an amount of energy applied to a thermal head is controlled in response to a gradation level of an image signal to print an image on a printing medium with gradations, comprises gradation density detecting means for storing data of standard density patterns with respect to address values corresponding to gradation levels, and for outputting a coincidence signal when data supplied from an outside of the gradation density detecting means substantially coincides with the data of standard density patterns; a gradation test print circuit for applying data of different amounts of printing energy to the thermal head sequentially to make a gradation test print on the printing medium; density detecting sensor means for detecting densities of the gradation test print and for applying a detection output from the density detecting sensor means to the gradation density detecting means; and a first memory element for storing the data of different amounts of energy with respect to address values corresponding to the gradation levels, in response to the coincidence signal from the gradation density detecting means.

DETAILED DESCRIPTION OF THE PREFERRED EMBODIMENTS

Preferred embodiments of this invention will be described with reference to the accompanying drawings.

Figure 1:
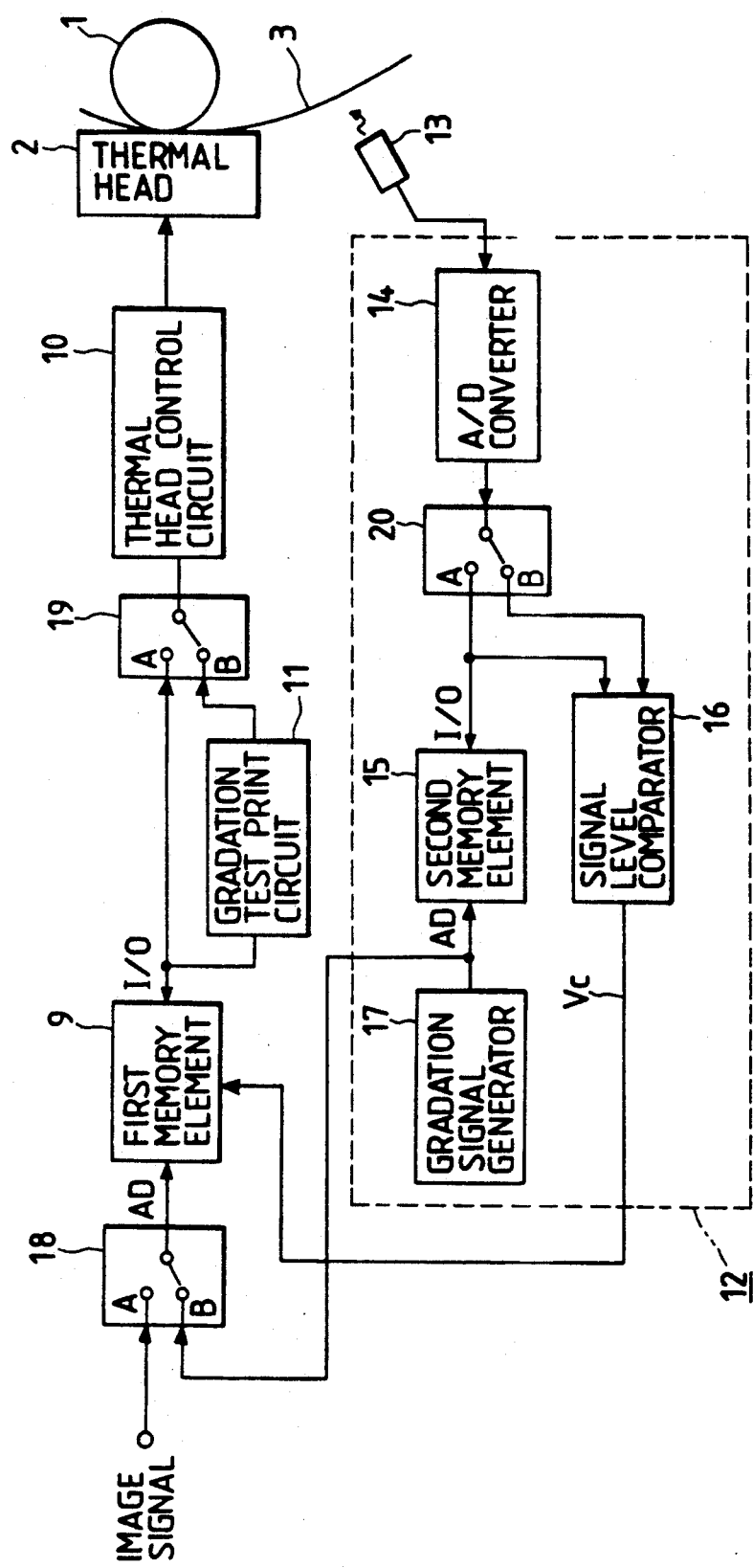
FIG. 1 is a block diagram showing the arrangement of a first example of the gradation record printer according to the invention.
Figure 2:
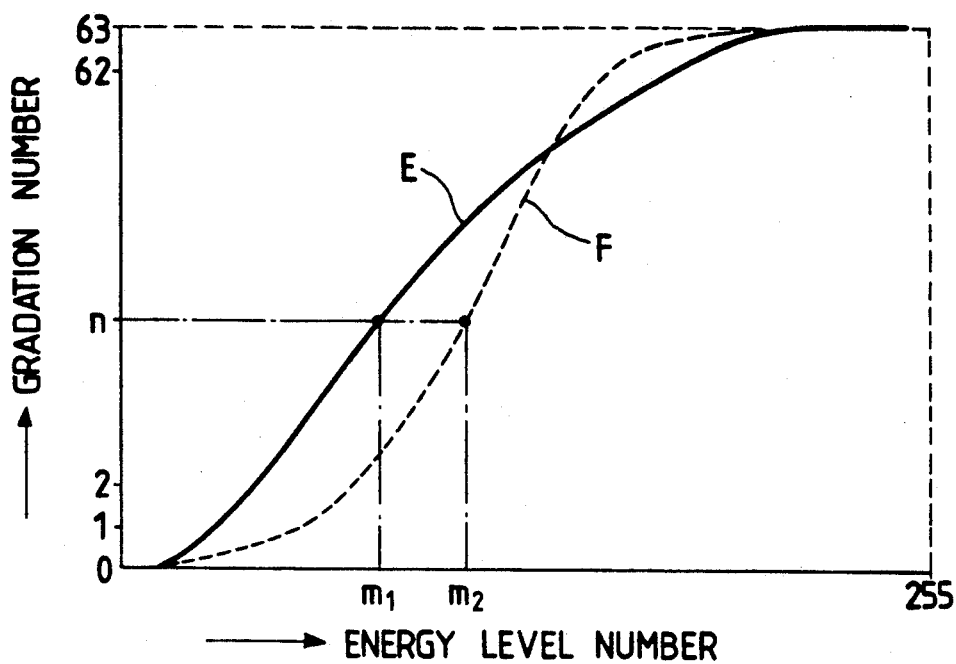
FIG. 2 is a graphical representation indicating the thermal characteristics of printing media.
Figure 3:
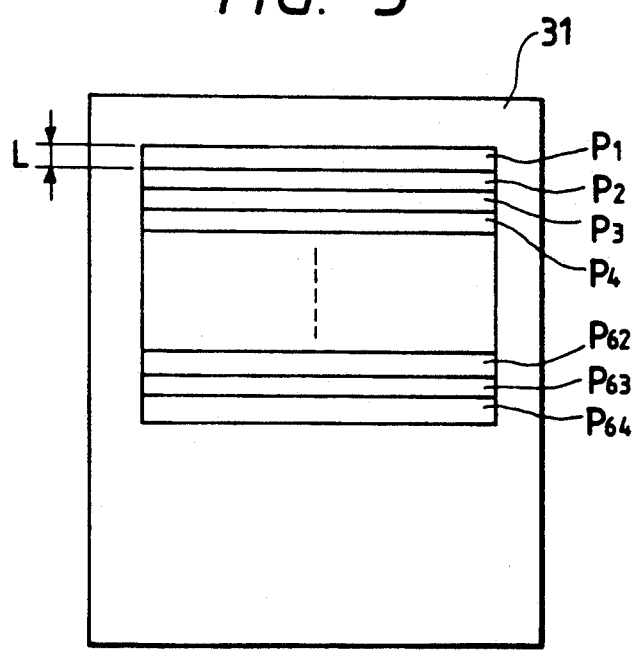
FIG. 3 is an explanatory diagram showing a standard test sheet.
Figure 4:
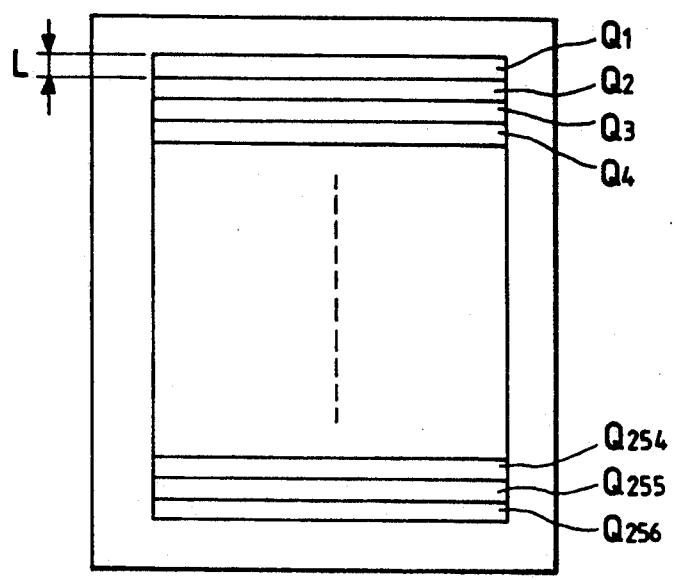
FIG. 4 is an explanatory diagram showing test print patterns obtained by gradation test printing.
Figure 5:
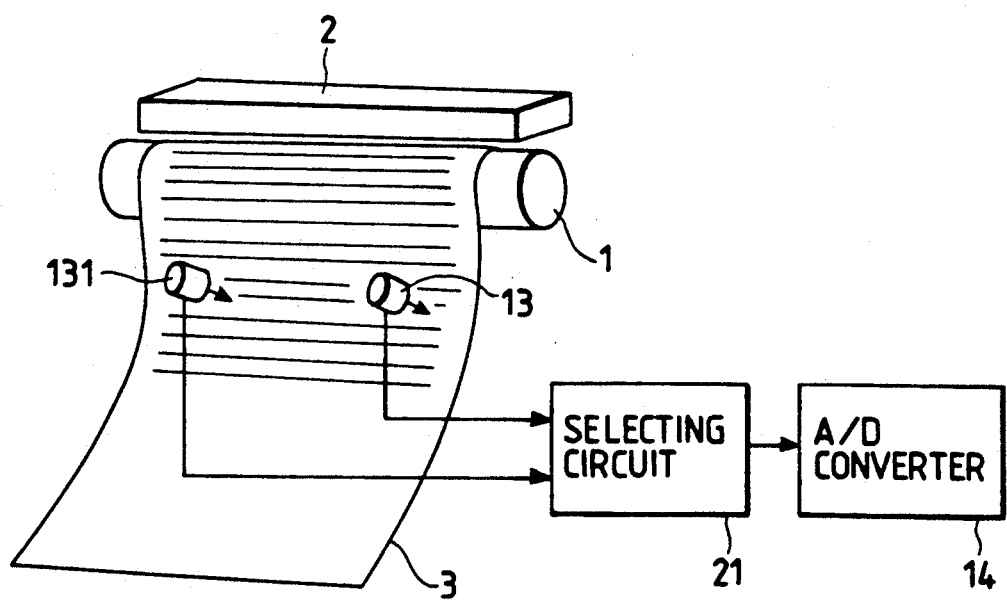
FIG. 5 is a perspective view showing a second example of the gradation record printer according to the invention.

FIG. 1 is a block diagram showing the arrangement of a first example of the gradation record printer according to the invention. FIG. 2 is a graphical representation indicating the thermal characteristics of printing media. FIG. 3 is a diagram showing a standard test sheet. FIG. 4 is a diagram showing a test pattern formed by gradation test printing. FIG. 5 is a perspective view showing a second example of the gradation record printer according to the invention.

Figure 6:
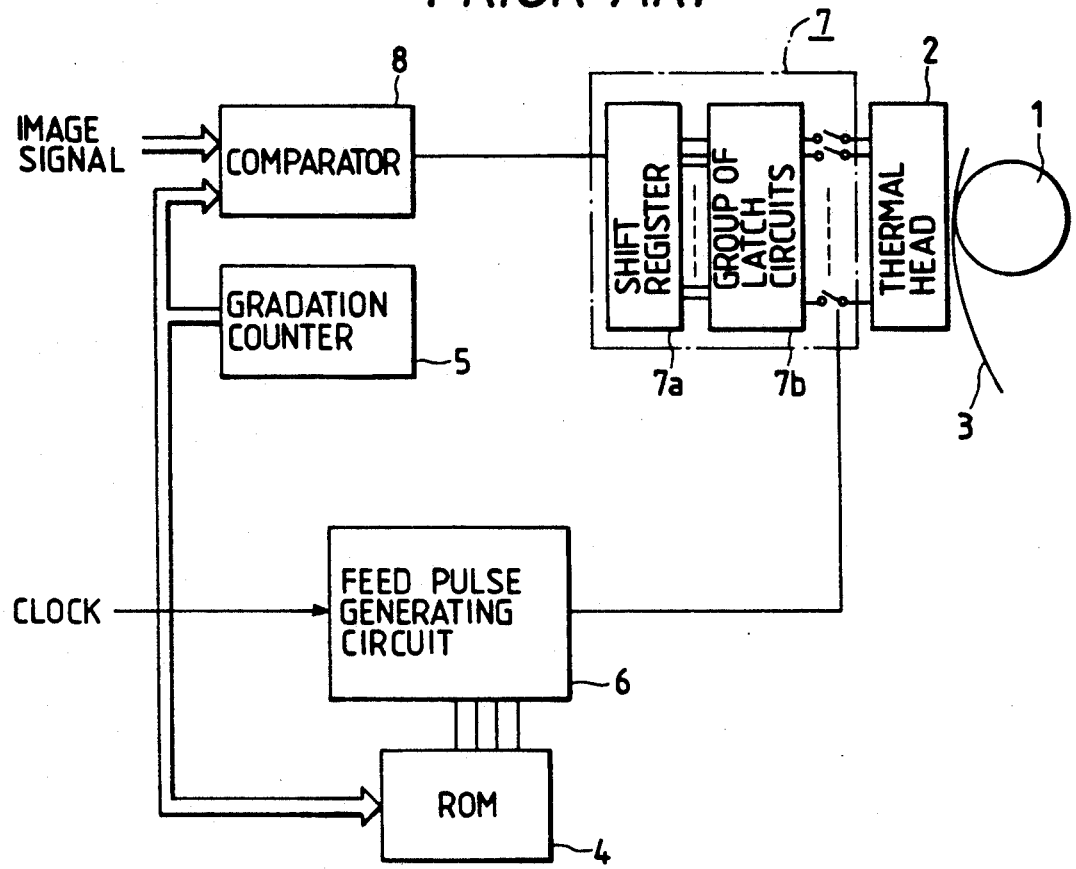
FIG. 6 is a block diagram showing the arrangement of a conventional gradation record printer.
Figure 7:
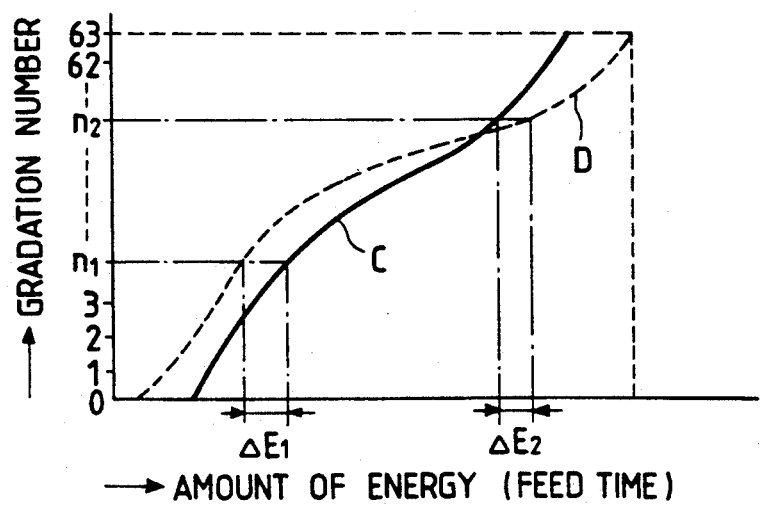
FIG. 7 is a graphical representation indicating the thermal characteristics of printing media.

In FIG. 1, reference numerals 1, 2 and 3 designate the same elements as those in FIG. 6; 9, a first memory element including for instance, a non-volatile RAM which receives a gradation signal through its address terminal AD and provides a signal corresponding to the level of the gradation signal at its input/output terminal I/O; 10, a thermal head control circuit for applying a predetermined amount of printing energy (or a predetermined number of pulses) to the thermal head 2 in accordance with the output signal of the first memory element 9; and 11, a gradation test print circuit. The gradation test print circuit 11 has stored 256 different amounts of printing energy (or 256 different numbers of pulses) from minimum to maximum, and outputs them beginning with the smallest which are applied to the thermal head control circuit 10 for a printing operation. Further in FIG. 1, reference numeral 13 designates a density detecting sensor for detecting the density of a test print pattern obtained by gradation test printing. Reference numeral 12 designates gradation density detecting means which comprises: an A/D (analog-to-digital) converter 14 for converting the output of the density detecting sensor 13; a second memory element 15 made up of a non-volatile RAM or the like for storing the output data of the A/D converter 14 corresponding to sixty-four (64) different gradation densities; a signal level comparator 16 which compares the output of the second memory element 15 with the output of the A/D converter 14, and outputs a coincidence signal VC when the two outputs are equal to or closest to each other; and a gradation signal generator 17 which produces sixty-four (64) different gradation density signals corresponding to gradation levels and applies them to the second memory element 15. Further, in FIG. 1, reference numerals 18, 19 and 20 designate switches for switching the gradation test printing and the actual printing over to each other.

The operation of the gradation record printer thus constructed will be described. First, a method will be described of storing the output data of the A/D converter 14 which correspond to sixty-four (64) different gradation densities in the second memory element 15 forming the gradation density detecting means 12. The armature of the switch 20 is tripped to the terminal A, in advance. Instead of the printing sheet 3, a standard density test sheet 31 is set in the gradation record printer. The standard density test sheet 31 has sixty-four different standard density patterns $P_1$ through $P_{64}$, each having a length of L in the sheet conveying direction. That is, the total length is (L×64). The length of L is set to be larger than the aperture of the density detecting sensor 13. The standard density test sheet 31 is conveyed by a platen 1, while the standard densities of the patterns $P_1$ through $P_{64}$ are detected by the density detecting sensor 13, and converted into digital signals by the A/D converter 14.

On the other hand, the gradation signal generator 17 produces gradation signals $V_1$ through $V_{64}$ corresponding to gradation levels in synchronization with the conveyance of the standard density test sheet 31, which are applied to the address terminal AD of the second memory element 15. As a result, the digital values of the gradation densities of the standard density patterns $P_1$ through $P_{64}$ are stored in the addresses $V_1$ through $V_{64}$ of the second memory element 15. Thus, the output data of the A/D converter 14, which correspond to the density values, respectively, have ben stored in the second memory element. This operation is carried out during manufacture of the gradation record printer, or in the case when the printer changes i printing characteristic with age or by replacement of the thermal head for maintenance.

Next, a method will be described of storing the amounts of energy (the numbers of pulses) to the thermal head 2 corresponding to the signal levels of the gradation numbers in the first memory element 9 with respect to a given printing medium. The armatures of the switches 18, 19 and 20 are tripped to the terminals B in advance, respectively.

The gradation test print circuit 11 is operated to produce 256 different amounts of printing energy (different numbers of pulses) successively beginning with the smallest, while the given printing medium is conveyed by the platen 1 in synchronization with the operation of the print circuit 11, so that print patterns as shown in FIG. 4 are printed on the printing medium. That is, 256 different density patterns $Q_1$ through $Q_{256}$, each being L in length similarly as in the case of the standard density test sheet shown in FIG. 3, are printed on the printing medium. The densities of the patterns thus printed are detected by the density detecting sensor 13, and converted into digital signals by the A/D converter 14.

On the other hand, the gradation signal generator 17 produces the gradation signal $V_1$, which is applied to the address terminal AD of the first memory element 9 and to the address terminal AD of the second memory element 15. As a result, the output signal corresponding to the gradation signal $V_1$ is outputted through the input/output terminal I/O of the second memory element 15. This output signal is compared with the output signal of the A/D converter 14 in the signal level comparator 16. This comparison is continued until the levels of the two signals coincide with each other with the density patterns $Q_1$ through $Q_{256}$ being detected by the density detecting sensor 13. When the levels of the two signals coincide with each other, the comparator 16 outputs a coincidence signal VC. In this case, the amount of printing energy (the number of pulses) for the thermal head 2 can be readily calculated in view of the amount of conveyance of the printing medium. The amount of printing energy thus calculated is stored in the address $V_1$ of the first memory element 9. Upon completion of the storage, the gradation signal generator 17 produces the next gradation signal $V_2$. Similarly as in the above-described case, the amount of printing energy of the thermal head 2 corresponding to the gradation signal $V_2$ is detected and stored in the address $V_2$ of the first memory element 9. In this manner, the amounts of printing energy corresponding to the gradation signals $V_1$ through $V_{64}$ are stored in the respective addresses.

That is, for a given printing medium, the amounts of printing energy of the thermal head 2 required for realizing the gradation densities can be stored in the first memory element 9.

FIG. 2 shows printing media E and F different in printing characteristic. With respect to a gradation number n, in the case of the printing medium E, printing energy or energy level number $m_1$ is detected and stored in the first memory element 9; and in the case of the printing medium F, printing energy $m_2$ is detected and stored in the first memory element 9.

In practical printing, the armatures of the switches 18 and 19 are tripped over to the terminals A, respectively. Then, the input image signal is applied to the address terminal AD of the first memory element 9, and the data for the amounts of printing energy corresponding to gradation levels of the image signal is read through the input/output terminal I/O of the element 9, whereby to perform a printing operation.

Hence, the printing operation can be performed with the printing energy suitable for the thermal characteristic of the given printing medium, and therefore the resultant print is excellent in gradation characteristic.

In the case where a plurality of kinds of printing media are used, the amounts of printing energy for those different printing media may be stored in the form of different tables in the first memory element 9 in advance, so that the different tables are selected for the different printing media, respectively.

In color printing, for yellow, cyan and magenta ink sheets the amounts of printing energy most suitable therefor can be obtained in the same manner. However, it should be noted that it is necessary to use the standard density test sheet is used for each of the three colors, yellow, cyan and magenta thereby to store the outputs of the A/D converter 14 in the second memory element 15.

Thus, in the gradation record printer of the invention, the gradation characteristic can be made most suitable even when the characteristic of the printer is changed, for instance, by deterioration with age or by replacement of components for maintenance.

FIG. 5 is a perspective view showing a second example of the gradation record printer. In FIG. 5, reference numerals 1, 2, 3, 13 and 14 designate the same elements as those in FIG. 1; 131, a second density detecting sensor which is located different from the first density detecting sensor 13, to detect the density of the same part of the test print together with the density detecting sensor 13 simultaneously; and 21, selecting means, or a selecting circuit for selectively applying one of the outputs of the first and second sensors 13 and 131 to the A/D converter 14.

When, in the above-described first example of the printer, the test print sheet is partially contaminated for instance, then density detecting sensor 13 detects the density including the contamination, and accordingly the amount of printing energy for the thermal head 2 is determined according to this erroneous density including the contamination. As a result, in this case, the gradations reproduced are not satisfactory.

On the other hand, the second example of the printer has two density detecting sensors 13 and 131 which are located at different positions to detect the density of the same gradation part of the test print, i.e., the same pattern. When the detection outputs of the two sensors 13 and 131 differ from each other more than a predetermined value, a value of amount printing energy close to that which has been stored in the first memory element 9 immediately before the detection, is selected by the selecting circuit 21. Further, the switching lo operation of the selecting circuit 21 and the detecting operation for detecting that the detection outputs of the two sensors 13 and 131 differ from each other more than the predetermined value are carried out by a CPU (central processing unit) not shown. According to the invention, even when a printing medium different in thermal characteristic is used, the amounts of printing energy for standard densities are stored in the memory element through gradation test printing, whereby the gradations can be reproduced satisfactorily. Further, the gradation record printer according to the invention is excellent in gradation reproduction, being free from the effect of contamination or the like on the printing medium.

What is claimed is:

1. A gradation record printer in which an amount of energy applied to a thermal head is controlled in response to a gradation level of an image signal, in order to print an image on a printing medium with gradations, said printer comprising:

gradation density detecting means including memory means for storing data of standard density patterns with respect to address values corresponding to gradation levels, and comparator means for outputting a coincidence signal when test data supplied from outside of said gradation density detecting means substantially coincides with said data of standard density patterns;

a gradation test print circuit for applying data of different amounts of printing energy to said thermal head sequentially to make a gradation test print on said printing medium;

density detecting sensor means for detecting densities of said gradation test print to produce the test data and for applying the test data output from said density detecting sensor means to said gradation density detecting means; and a first memory element for storing data of different amounts of energy with respect to address values corresponding to said gradation levels, in response to said coincidence signal from said gradation density detecting means.

2. The gradation record printer according to claim 1, wherein said gradation density detecting means includes a second memory element for storing said data of standard density patterns, and a signal level comparator for outputting said coincidence signal.

3. The gradation record printer according to claim 2, wherein said gradation density detecting means further includes a gradation signal generator for outputting a signal which indicates said gradation levels.

4. The gradation record printer according to claim 1, wherein said density detecting sensor means includes a plurality of density detecting sensors which are located at different positions from each other to concurrently detect a density of a pattern of said gradation test print, and the test data output from one of said plurality of density detecting sensors is selectively applied to said gradation density detecting means.

5. An apparatus for determining an amount of energy to be applied to a thermal head for printing an image with gradations on a printing medium, said apparatus comprising:

first storage means for storing data of standard density patterns with respect to gradation levels;

means for producing a gradation test print on the printing medium by supplying various amounts of printing energy to the thermal head;

means for measuring a density of each pattern of the gradation test print; and second storage means for storing, for each of the gradation levels available, the amount of printing energy producing the part of the gradation test print in which the density of the part of the gradation test print measured substantially coincides with the data of the standard density patterns stored.

6. A method for determining an amount of energy to be applied to a thermal head of a printer for printing an image with gradations on printing medium, comprising the steps of:

(a) storing data of standard density patterns with respect to gradation levels;

(b) producing a gradation test print on the printing medium by supplying various amounts of printing energy to the thermal head;

(c) measuring a density of each pattern of the gradation test print; and (d) storing, for each of the gradation levels available, the amount of printing energy producing the part of the gradation test print in which the density of the part of the gradation test print measured substantially coincides with the data of the standard density patterns stored.

7. A method according to claim 6, wherein said storing steps (a) comprises the steps of:

(i) measuring densities of various parts of a standard density test sheet; and (ii) storing the densities measured in step (a) (i) as the data of standard density patterns.

8. A method according to claim 6, wherein said method further comprises the step of (e) repeating steps (b)-(d) for each of a plurality of printing mediums.

9. A method according to claim 6, wherein said measuring step (c) comprises the steps of:

(i) measuring a density of a pattern of the gradation test print with a first sensor located at a first position; and (ii) concurrently measuring a density of said pattern of the gradation test print with a second sensor located at a second position, wherein measurement by the first and second sensors are always associated with the same pattern.

* * * * *